(12) United States Patent
Kato et al.

(10) Patent No.: US 6,736,645 B2
(45) Date of Patent: May 18, 2004

(54) ROTARY CONNECTOR THAT PREVENTS EXCESSIVE TEMPERATURE INCREASE GENERATED IN A FLEXIBLE CABLE

(75) Inventors: Hironori Kato, Miyagi-ken (JP); Yoshio Sanpei, Miyagi-ken (JP); Toshiyuki Hoshi, Rochester, MI (US)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/050,623

(22) Filed: Jan. 16, 2002

(65) Prior Publication Data

US 2002/0094700 A1 Jul. 18, 2002

(30) Foreign Application Priority Data

Jan. 18, 2001 (JP) ........................................ 2001-010783
Jan. 18, 2001 (JP) ........................................ 2001-010784

(51) Int. Cl.[7] .............................................. H01R 39/00
(52) U.S. Cl. .......................... 439/15; 439/164; 439/621
(58) Field of Search .......................... 439/15, 164, 621, 439/622

(56) References Cited

U.S. PATENT DOCUMENTS

| 4,310,174 A | | 1/1982 | Sundeen et al. | |
|---|---|---|---|---|
| 5,219,460 A | | 6/1993 | Kato et al. | |
| 6,007,355 A | | 12/1999 | Shibata et al. | |
| 6,147,868 A | * | 11/2000 | Boutillier et al. | ........... 361/707 |
| 6,268,588 B1 | * | 7/2001 | Hazebrouck et al. | ....... 219/204 |
| 6,299,466 B1 | | 10/2001 | Bolen et al. | |

* cited by examiner

*Primary Examiner*—Truc Nguyen
(74) *Attorney, Agent, or Firm*—Brinks Hofer Gilson & Lione (57) ABSTRACT

The rotary connector comprises a stationary housing 11 having a cylindrical portion 17 therein, a movable housing 12 having a cylindrical portion 19 therein provided on the stationary housing so as to be rotatable relatively thereto, and a flexible cable 14 accommodated within a housing section 13 formed between the stationary housing and the movable housing, in which the rotary connector further includes temperature detection means 41 for detecting the temperature of the flexible cable in a state of the temperature detection means being exposed within the housing section.

11 Claims, 6 Drawing Sheets

ROTARY CONNECTOR THAT PREVENTS EXCESSIVE TEMPERATURE INCREASE GENERATED IN A FLEXIBLE CABLE

BACKGROUND OF THE INVENTION

1. Field of the Invention

The present invention relates to a rotary connector used as electrical connection means for providing a heater device incorporated in a steering apparatus of a motor vehicle or the like and an electronic device such as an air bag system equipped on a car body with an electrical connection.

2. Description of the Related Art

A rotary connector is generally incorporated in a steering apparatus of a motor vehicle or the like and employed as electrical connection means for providing a heater circuit employed in a steering apparatus, an air bag circuit, a horn circuit or other switch circuits, all of which are incorporated in a steering wheel, with an electrical connection. Furthermore, the rotary connector basically comprises a pair of a stationary housing and a movable housing, both being disposed coaxially and connected together so as to be rotatable relatively to each other, an annular space as a cable housing formed between a pair of those stationary and movable housings, a flexible cable housed in the annular space in a manner that the flexible cable can be wound and unwound, and lead blocks correspondingly connected to both ends of the flexible cable.

The flexible cable is constructed so that a plurality of (for example, four pieces of) conductors made of a flat strip of extremely thin copper foil or the like, each conductor being interposed between two sheets of insulating films as a flat strip of base film, are disposed in parallel with each other and stuck to the insulating films.

The rotary connector having such basic construction is further fabricated as follows: fix the stationary housing to the car body while fixing the movable housing to the handle member; and further, connect both ends of the flexible cable to associated electronic devices on the sides of the car body and the handle member via respective lead blocks fixed to the stationary and movable housings; and thereby realizing electrical connection means for providing a heater circuit device for steering apparatus, an air bag system, a horn circuit and/or the like for motor vehicle, with an electrical connection.

That is, the electrical connection means functions when a predetermined current flows through each of a plurality of conductors of the flexible cables.

However, in the above-described rotary connector, the flexible cable is accommodated in a space formed between the stationary housing and the movable housing and is constructed so that a plurality of conductors made of a strip of extremely thin copper (Cu) foil or the like are stuck to the insulating films. As a result, the amount of current allowed to flow through each conductor cannot be made larger than expected.

Additionally, in recent years, it has been seen a phenomenon as a trend that a vehicle primarily used in a cold district is equipped with a steering apparatus constructed such that a heater circuit device to warm a steering (handle) is incorporated therein. The heater circuit device used for the steering is required to supply a relatively large current to a heater device to generate heat therein and therefore, it has been required that the conductor of the flexible cable is able to allow a large current to flow therethrough.

However, when a large current flows through the conductor, such a problem has been seen that the conductor generates excessive heat in some cases and owing to the increase in temperature of the conductor caused by this excessive heat generation, the insulating film is deformed, molten adhesively or the conductor is broken, leading to occurrence of trouble in the function of rotary connector.

SUMMARY OF THE INVENTION

An object of the present invention is to provide a rotary connector capable of preventing excessive temperature increase generated in a flexible cable by employing temperature detection means for detecting the temperature of the flexible cable.

A rotary connector of the present invention comprises:
a stationary housing having a cylindrical portion;
a movable housing having a cylindrical portion and provided on the stationary housing so as to be rotatable relatively thereto; and
a flexible cable accommodated within a housing section formed between the stationary housing and the movable housing;
in which the flexible cable is constructed such that both ends thereof are fixed to the stationary housing and the movable housing, respectively, and the rotary connector is further constructed to have temperature detection means therein for detecting a temperature of the flexible cable in a state of the temperature detection means being exposed within the housing section.

The above-described construction allows the rotary connector to monitor the increase in temperature of the flexible cable due to the current flow therethrough and therefore, the rotary connector is able to detect the increase in temperature of the flexible cable due to the excessive heat generation via the temperature detection means and further appropriately control the excessive heat generation in the flexible cable by receiving a signal from the temperature detection means, thereby realizing provision of a rotary connector capable of preventing deformation or fusion of insulating film.

Furthermore, the rotary connector of the present invention is further constructed such that the temperature detection means is provided in one of the cylindrical portion of the stationary housing and the cylindrical portion of the movable housing.

The above-described construction can prevent the occurrence of phenomenon that the rotary connector becomes large by installation of the temperature detection means and further facilitate the installation thereof.

Additionally, the rotary connector of the present invention further includes a holding member therein for holding the temperature detection means and the holding member is provided in one of the cylindrical portion of the stationary housing and the cylindrical portion of the movable housing.

The above-described construction allows for installation of the temperature detection means via the holding member, thereby enhancing easiness of installation and removal of the temperature detection means.

Moreover, the rotary connector of the present invention is further constructed such that the temperature detection means is provided near one of fixing portions located between the flexible cable and one of the stationary housing and the movable housing.

The above-described construction allows for stable operation for detecting temperature via the temperature detection means since the flexible cable moves little near the lead blocks in the event of the flexible cable being wound or unwound.

In addition, the rotary connector of the present invention further includes a pressing member therein provided to face the temperature detection means and press the flexible cable against the temperature detection means.

The above-described construction allows for secure operation for detecting the temperature of the flexible cable via the temperature detection means since the flexible cable is pressed against the temperature detection means by the pressing member.

Furthermore, the rotary connector of the present invention is further constructed such that the pressing member has a structure independent of the stationary housing and the movable housing and is provided in one of the cylindrical portion of the stationary housing and the cylindrical portion of the movable housing.

Compared with the case where the stationary or movable housing itself is directly installed in the rotary connector to replace associated pressing member, the above-described construction allows the operation for installing and replacing the pressing member to become easier and lower in cost since the pressing member has a structure independent of the housing.

Moreover, the rotary connector of the present invention is further constructed such that the pressing member includes an elastic portion therein having elasticity and presses the flexible cable via the elastic portion.

The above-described construction allows the rotary connector to further securely press the flexible cable against the temperature detection means via the pressing member.

Additionally, the rotary connector of the present invention is further constructed such that the temperature detection means is composed of a temperature sensor.

The above-described construction allows for provision of a low-cost and performance-stable rotary connector since the temperature sensor is inexpensive and is able to easily detect the desired temperature.

Furthermore, the rotary connector of the present invention is further constructed such that the temperature detection means is composed of a thermistor.

The above-described construction allows for provision of a compact and inexpensive rotary connector since the thermistor is inexpensive in addition to being compact.

DETAILED DESCRIPTION OF THE PREFERRED EMBODIMENTS

Figure 1:
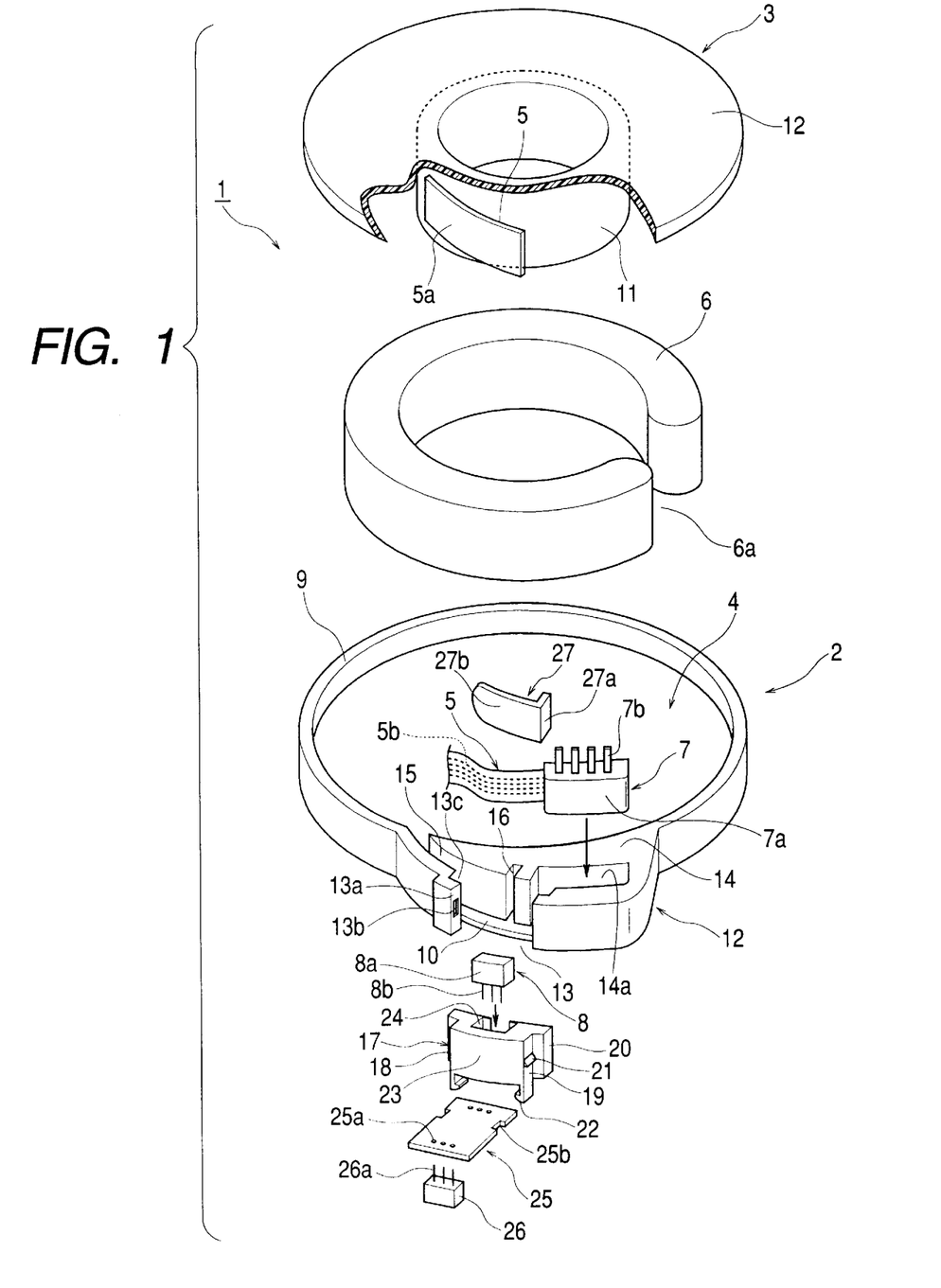
FIG. 1 is an exploded perspective view of a rotary connector in accordance with a first embodiment of the present invention.

A rotary connector in accordance with the present invention will be explained below with reference to the accompanying drawings. FIG. 1 is an exploded perspective view of a rotary connector in accordance with a first embodiment of the present invention.

Referring to FIG. 1, the overall construction of a rotary connector 1 explained hereinafter includes: a stationary housing 2; a movable housing 3 connected to the stationary housing 2 so as to be rotatable relatively thereto; a flexible cable 5 as a flat cable housed within a housing section 4 formed between the stationary and movable housings 2, 3; a movable structure 6 rotatably disposed between the stationary and movable housings 2, 3; a lead block 7 connected to the flexible cable 5; and a temperature sensor 8 as temperature detection means for detecting temperature of the flexible cable 5 while exposing the body of the temperature sensor within the housing section 4.

The stationary housing 2 includes a cylinder-shaped outer cylindrical portion 9, a circular bottom wall 10 formed on the end of the outer cylindrical portion 9 and a circular hole (not shown) formed in a central portion of the bottom wall 10. On the other hand, the movable housing 3 includes a cylinder-shaped inner cylindrical portion 11 and an approximately annular upper wall 11a provided on one end of the inner cylindrical portion 11. The outer cylindrical portion 9 and the inner cylindrical portion 11 are coaxially disposed, and the movable structure 6 is disposed in the housing section 4 located between the outer and inner cylindrical portions 9, 11.

The movable structure 6 being shaped like C-letter and made of a synthetic resin is disposed within the housing section 4 to be movable along the circumference thereof, and the flexible cable 5 is disposed along and wound around the circumferential surface of the movable structure 6, and further, the flexible cable 5 positioned along the circumferential surface of an opening end 6a of the movable structure 6 is disposed so as to be turned back in a reverse direction at this position (turned-back portion). That is, the flexible cable 5 at the position of the turn-back portion (not shown) is disposed to form a loop along the circumferential surface of the opening end 6a constituting one end of the movable structure 6.

The flexible cable 5 is formed so that a plurality of (for example, four pieces of) conductors 5b made of a flat strip of copper foil or the like having an extremely thin thickness are stuck adhering to and interposed between two sheets of insulating films 5a made of a flat strip of insulating tape such as polyethylene terephthalate (PET), while being disposed in parallel with each other. Outer ends of the conductors 5b of the flexible cable 5 are electrically and mechanically connected to the lead block 7 as a stationary joint portion fixed to the outer cylindrical portion 9 and have electrical connection with the outside of the stationary housing 2 via the lead block 7.

Furthermore, inner ends of the flexible cable 5 are electrically and mechanically connected to the lead block (not shown) as a movable joint portion fixed to the inner cylindrical portion 11 and have electrical connection with the outside of the movable housing 3 via the lead block.

Subsequently, the constructions of the stationary housing 2 and the temperature sensor 8 will be explained in detail.

First, as shown in FIG. 1, the stationary housing 2 made of a synthetic resin and formed by molding includes an outer cylindrical portion 9 being approximately shaped like cylinder, holding means 12 formed in a predetermined portion of the outer cylindrical portion 9 and projecting toward outside, a bottom wall 10 formed on the end of the outer cylindrical portion 9, and a circular hole (not shown) formed in a central portion of the bottom wall 10.

Furthermore, the holding means 12 comprises a rectangular cut-portion 13 formed in the outer cylindrical portion 9, recesses 13b formed in opposing inner walls 13a of the cut-portion 13, a first engagement portion 14a being approximately shaped like rectangle and recess, and formed in a thick block 14 of the outer cylindrical portion 9, a slit-shaped guide portion 15 formed between the thick block 14 and the outer cylindrical portion 9 while constituting a part of the housing section 4, and a second engagement portion 16 being shaped like groove penetrating the thick block in a direction in parallel with the axis of the stationary housing 2 and formed in a portion of the thick block 14, the portion being located at the position facing the cut-portion 13 of the thick block 14. Additionally, near the inner walls 13a are formed steps 13c. Moreover, one end of the guide portion 15 is spatially communicated with the inside of the outer cylindrical portion 9 and one end of the first engagement portion 14a is spatially communicated with the cut-portion 13.

A holding member 17 made of a synthetic resin and formed by molding comprises an approximately rectangular base section 18, collars 20 projecting toward outside from one set of opposing side walls 19 of the base section 18, a pair of projections 21 formed on predetermined areas of the side walls 19, a pair of hooks 22 extending beyond the lower ends of the side walls 19, and a recess 24 formed in one of another set of opposing side walls 23. Additionally, the upper end of the recess 24 is open. That is, the holding member 17 is formed as another structure independent of the stationary housing 2.

The holding member 17 is to be mounted in the cut-portion 13 of the stationary housing 2 to fill in the cut-portion 13. This mounting operation is performed so that the collars 20 of the holding member 17 mate with the steps 13c of the cut-portion 13 and the projections 21 of the holding member 17 are inserted into the recesses 13b of the cut-portion 13, whereby the holding member 17 is integrally incorporated into the stationary housing 2.

In the above-described construction, the recess 24 of the holding member 17 is being mounted in the stationary housing so as to expose the surface thereof toward the side of the guide portion 15 constituting a part of the housing section 4.

The temperature sensor 8 as temperature detection means is employed for detecting temperature and for instance, is composed of a thermistor, a bimetal or the like, and comprises an approximately rectangular detection unit 8a and three terminal pins 8b led from the detection unit 8a.

The detection unit 8a of the temperature sensor 8 is held in place within the recess 24 of the holding member 17 by pressing the detection unit into the recess 24. In this case, the detection unit 8a is mounted in the holding member so as to expose the surface thereof at the temperature-detection side toward the side of the guide portion 15.

Furthermore, the terminal pins 8b of the temperature sensor 8 project toward outside beyond the holding member 17.

A printed wire board 25 made of an insulating plate has a predetermined circuit pattern (not shown) formed on at least one of surfaces thereof and six pieces of terminal holes 25a formed in predetermined portions thereof in addition to a pair of cut-portions 25b formed in opposing sides thereof.

The printed wire board 25 is mounted on the lower end of the holding member 17 in such a manner that the printed wire board 25 is hooked on the hooks 22 that penetrate the cut-portions 25b of the printed wire board 25 and thereby integrally incorporated with the holding member 17. Furthermore, the terminal pins 8b of the temperature sensor 8 are inserted through the terminal holes 25a and then fixed to the circuit pattern by soldering.

A connector 26 includes three terminal pins 26a and the terminal pins 26a inserted through the terminal holes 25a of the printed wire board 25 are fixed to the circuit pattern via solder, whereby the connector 26 and the printed wire board 25 are integrally incorporated with each other.

A pressing member 27 made of a synthetic resin and formed by molding includes a support portion 27a and a tongue-shaped elastic portion 27b having elasticity and extending therefrom in a direction approximately perpendicular to the support portion 27a.

The pressing member 27 is mounted in the stationary housing so that the support portion 27a of the pressing member mates with and is supported by the second engagement portion 16 formed in the thick block 14 and in this state, the elastic portion 27b is being mounted so as to face the detection unit 8a of the temperature sensor 8.

The lead block 7 includes an approximately rectangular base section 7a and four connection terminal leads 7b formed by insert molding and projecting toward outside.

The flexible cable 5 has already been explained above and therefore, further explanation thereof will be omitted except that the flexible cable 5 is constructed so that the ends of the conductors 5b are mechanically and electrically connected to the respective connection terminal leads 7b of the lead block 7 by, for instance, applying supersonic vibration.

Furthermore, the above-described lead block 7 is accommodated and held in place within the first engagement portion 14a of the stationary housing 2.

In the above-described construction, the temperature sensor 8 is being provided in the vicinity of the lead block 7.

Additionally, in this construction, the portion around the end of the flexible cable 5 is located within the guide portion 15, and is interposed between the elastic portion 27b of the pressing member 27 and the detection unit 8a of the temperature sensor 8. Furthermore, the flexible cable 5 is pressed against the detection unit 8a by the elastic portion 27b so as to make the detection unit 8a securely contact with the surface of the flexible cable 5.

The rotary connector 1 having such construction is finally used as electrical connection means for providing a heater device for steering apparatus, an air bag system, a horn circuit and/or the like for motor vehicle, with an electrical connection after the following assembling operation. That is, the stationary housing 2 is fixed to the car body (not shown) and the movable housing 3 is fixed to the handle member (not shown) and further, both ends of the flexible cable 5 are connected to the associated electronic devices on the sides of the car body and the handle member via the respective lead blocks 7 of the stationary and movable housings.

As can be understood, the flexible cable 5 functions as electrical connection means when a predetermined current flows through each of the plurality of conductors 5b of the flexible cable 5.

The rotary connector 1 constructed as described above has a temperature detection and control mechanism as follows: a predetermined current flows through the associated conductors 5b of the flexible cable 5; and the temperature of the conductors 5b is increased by the current flow therethrough; and then, the temperature increase generated in the conductors 5b, i.e., the flexible cable 5 is continuously detected by the detection unit 8a of the temperature sensor 8; and finally, the flexible cable 5 is preferably controlled not to excessively generate heat by the detection unit 8a which performs the operation for detecting the temperature of the flexible cable 5.

Next, a signal processing procedure for processing a temperature signal from the temperature detection means of the rotary connector in accordance with the first embodiment of the present invention will be explained.

Figure 2:
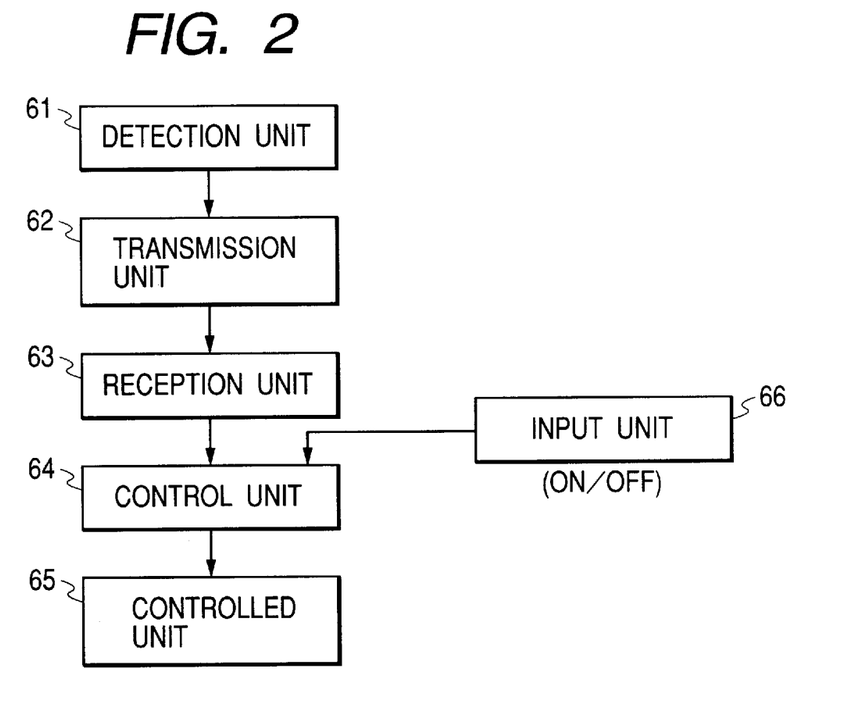
FIG. 2 is a block diagram illustrating a first exemplary signal processing construction of procedure for processing a temperature signal from temperature detection means employed in the rotary connector in accordance with the present invention.
Figure 3:
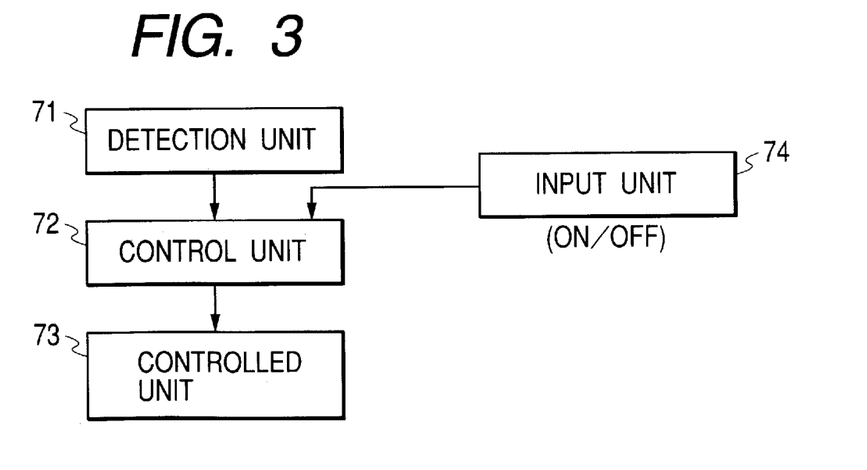
FIG. 3 is a block diagram illustrating a second exemplary signal processing construction of procedure for processing a temperature signal from temperature detection means employed in the rotary connector in accordance with the present invention.

FIG. 2 is a block diagram illustrating a first exemplary signal processing construction of procedure for processing a temperature signal from temperature detection means of the rotary connector in accordance with the first embodiment of the present invention, and FIG. 3 is a block diagram illustrating a second exemplary signal processing construction of procedure for processing a temperature signal from temperature detection means of the rotary connector in accordance with the first embodiment of the present invention.

First, as shown in FIG. 2, a signal processing mechanism performed within a vehicle via LAN (Local Area Network) cable comprises a detection unit 61 as the above-described temperature detection means for detecting a temperature and outputting a temperature signal representing the detected temperature, a transmission unit 62 for converting the temperature signal from the detection unit 61 to a signal to be transmitted via a LAN cable and further transmitting (sending) the signal, a reception unit 63 for receiving the signal from the transmission unit 62 and converting the signal to the temperature signal, a control unit 64 composed of a Central Processing Unit (CPU) or the like for arithmetically calculating the temperature signal from the reception unit 63 and outputting a control signal, a controlled unit 65 composed of a heater circuit, a horn circuit or the like and controlled by the control signal from the control unit 64, and an input unit 66 composed of a switching element or the like for transmitting ON/OFF signal to the control unit 64.

In the above-described signal processing construction, the transmission unit 62 and the reception unit 63 are connected with each other via the LAN cable, and a variety of different multiple signals are transmitted on the LAN cable.

In such a signal processing construction, the temperature of the flexible cable 5 is controlled as follows: the detection unit 61 detects the temperature of heat generated by the flexible cable 5 (refer to FIG. 1); and then, the temperature signal outputted by the detection unit is supplied to the control unit 64 via the transmission unit 62 and the reception unit 63; and further, the inputted temperature signal and the previously defined reference temperature are compared by the control unit 64; and thereafter, when the inputted temperature signal is lower than the defined reference temperature, the control unit 64 outputs a control signal to the controlled unit 65 such that a current is continuously supplied thereto and thus, the current is continuously supplied to the controlled unit 65.

On the other hand, when the inputted temperature signal is higher than the defined reference temperature, the control unit 64 outputs a control signal to the controlled unit 65 such that the supply of current thereto is temporarily stopped; and then, in accordance with the control signal, the controlled unit 65 is controlled such that the supply of current thereto is stopped; and as a result, the controlled unit 65 and the flexible cable 5 supplying a current thereto are controlled so as not to generate excessive heat.

In addition, subsequently, when the temperature increased by the heat generation in the flexible cable is lowered by stopping the supply of current to the controlled unit 65 and the temperature detected by the detection unit 61 as temperature detection means becomes lower than the defined reference temperature, by receiving a control signal from the control unit 64, the controlled unit 65 again begins to operate allowing a current to flow through the flexible cable to supply the current to the controlled unit 65.

Furthermore, for instance, the input unit 66 composed of a switching element through which a driver can manually input a signal is constructed as follows: for example, as for a heater circuit, a signal for controlling the heater circuit by an ON/OFF command is manually inputted to the control unit 64; and as a result, the heater circuit can be turned on and off via the control unit 64.

Next, the signal processing construction within a vehicle in a case where the operation for controlling the temperature of the flexible cable is performed directly via a wire harness cable is as follows: the basic construction shown in FIG. 3 is the same as that of the previously described construction of FIG. 2, which employs the LAN cable, except that the transmission unit 62 and the reception unit 63 employed in the construction of FIG. 2, both being connected to each other via the LAN cable, are not provided in the construction of FIG. 3; and therefore, comprises a detection unit 71, a control unit 72, a controlled unit 73 and an input unit 74, all of which have the same constructions as those of corresponding units employed in the first exemplary signal processing construction. That is, in the above-described construction, the detection unit 71 and the control unit 72 are directly connected to each other via the wire harness cable.

As the signal processing operation performed by the direct connection between the detection unit 71 and the control unit 72 via the wire harness cable is approximately similar to that performed in the case where the connection between the above-described two units is carried out via the LAN cable, the explanation of operation associated with the wire harness cable is omitted.

It should be noted that in the first embodiment, although the temperature detection means is provided in the cylinder-shaped outer cylindrical portion 9 of the stationary housing 2, the construction of temperature detection means in accordance with the invention is not limited to the above-described construction and therefore, the temperature detection means may be provided in the inner cylindrical portion of the movable housing, the bottom wall of the stationary housing, the upper wall of the movable housing or the like so as to expose the temperature detection means within the housing section.

Furthermore, in the first embodiment, although the holding member for holding the temperature detection means is provided in the outer cylindrical portion of the stationary housing, the construction of holding member in accordance with the invention is not limited to the above-described construction and therefore, the holding member may be provided in the inner cylindrical portion of the movable housing.

Moreover, in the first embodiment, although the pressing member is formed of a material independent of the stationary and movable housings and provided in the cylindrical portion of the stationary housing, the construction of pressing member in accordance with the invention is not limited to the above-described construction and therefore, the pressing member may be provided in the cylindrical portion of the movable housing or integrally formed with either the stationary housing or the movable housing.

Additionally, in the first embodiment, although the temperature detection means is provided near the lead block, the construction of temperature detection means in accordance with the invention is not limited to the above-described construction and therefore, the temperature detection means may employ any construction as far as it is provided so as to expose itself within the housing section.

Figure 4:
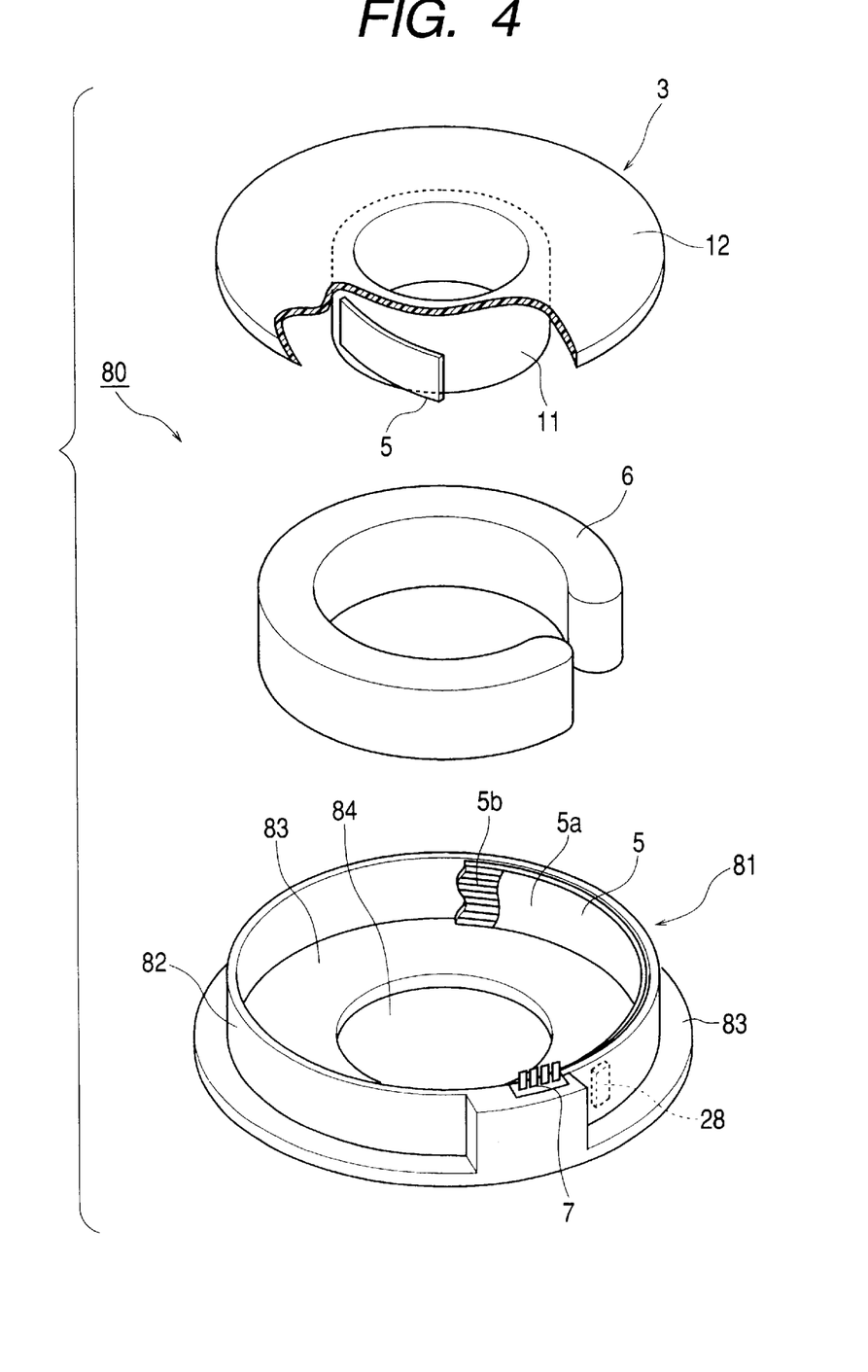
FIG. 4 is an exploded perspective view of a rotary connector in accordance with a second embodiment of the present invention.
Figure 5:
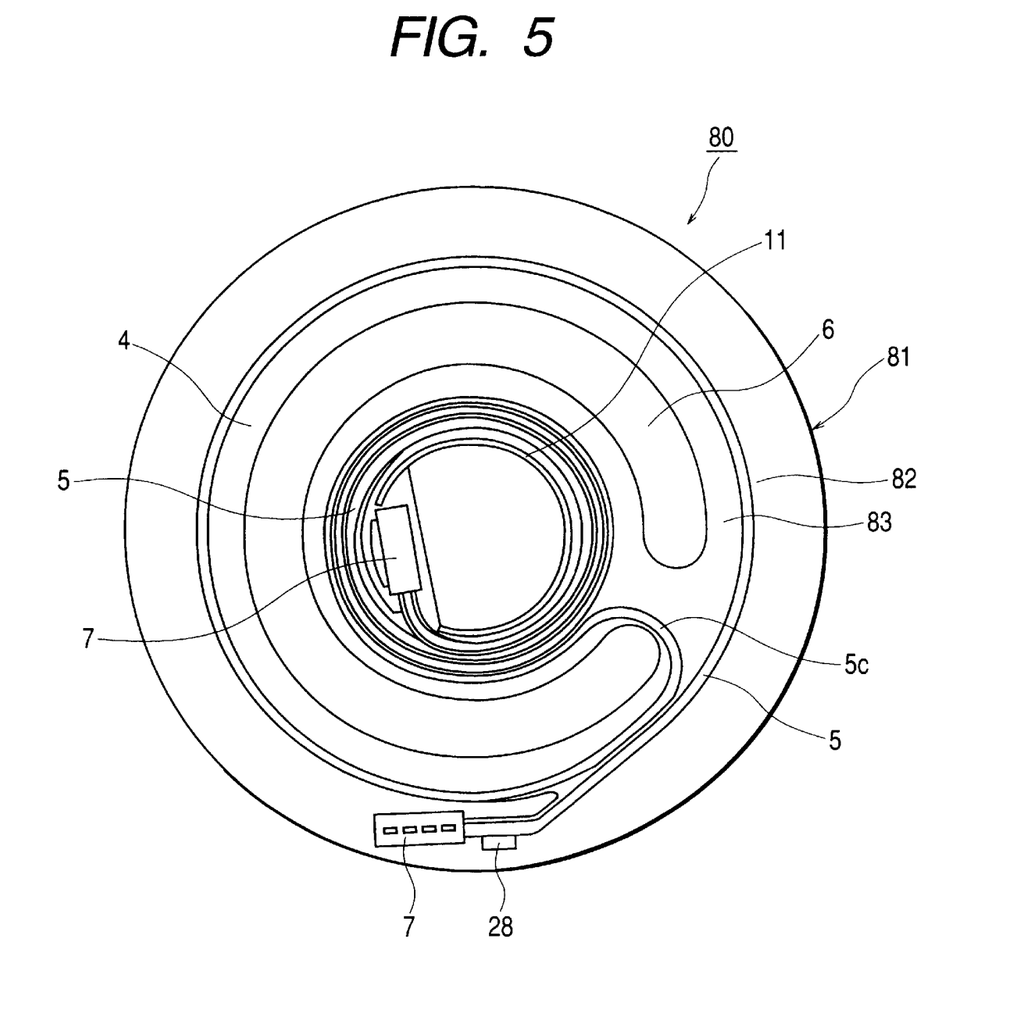
FIG. 5 is a plan view of the rotary connector in accordance with the second embodiment of the present invention.
Figure 6:
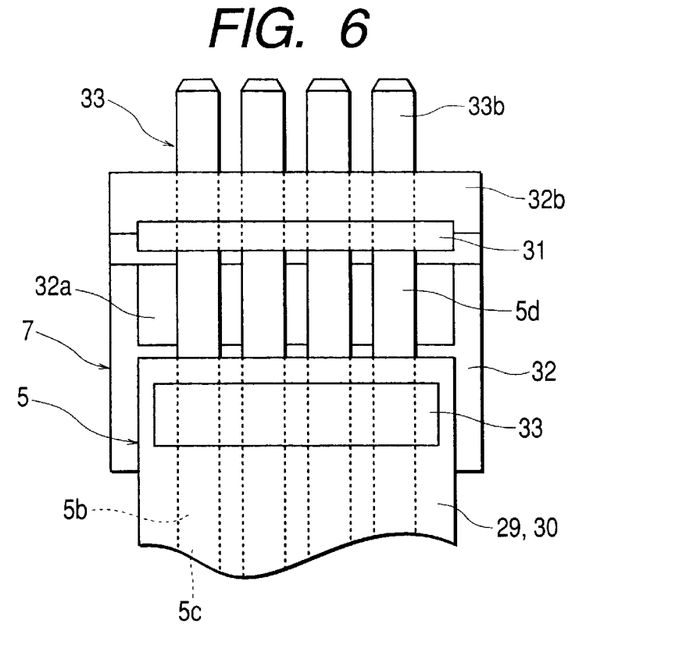
FIG. 6 is a primary plan view of a first example employed in the rotary connector in accordance with the second embodiment of the present invention, illustrating a connection status of the associated connection part between a flexible cable and a lead block.
Figure 7:
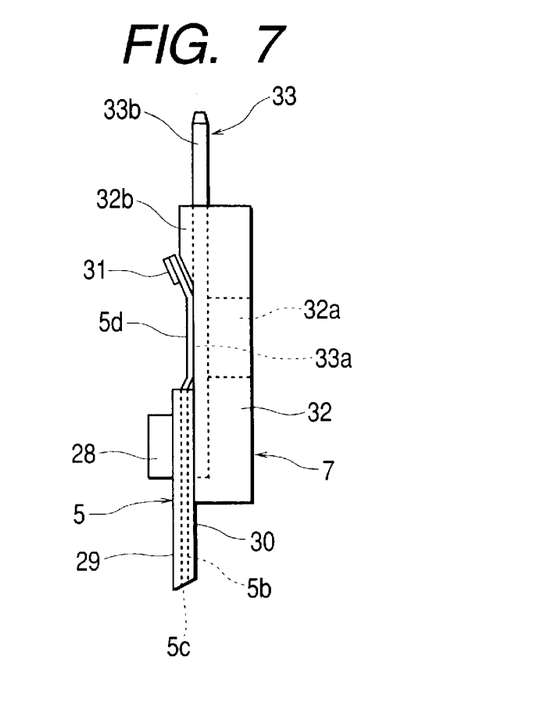
FIG. 7 is a primary side view of the first example employed in the rotary connector in accordance with the second embodiment of the present invention, illustrating a connection status of the associated connection part between a flexible cable and a lead block.
Figure 8:
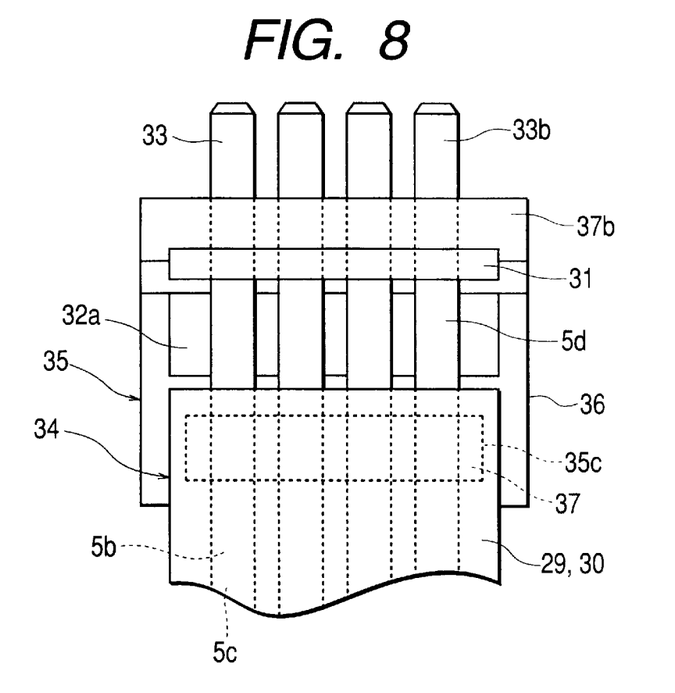
FIG. 8 is a primary plan view of a rotary connector in accordance with a third embodiment of the present invention, illustrating a connection status of the associated connection part between a flexible cable and a lead block.
Figure 9:
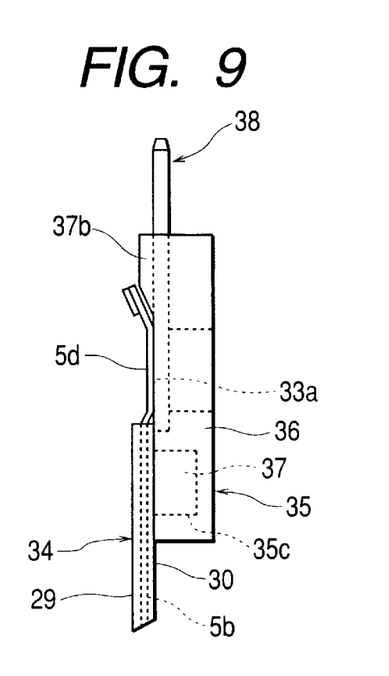
FIG. 9 is a primary side view of the rotary connector in accordance with the third embodiment of the present invention, illustrating a connection status of the associated connection part between a flexible cable and a lead block.

Next, the rotary connector in accordance with second and third embodiments of the present invention will be explained with reference to the accompanying drawings: FIG. 4 is an exploded perspective view of the rotary connector in accordance with the second embodiment of the present invention; FIG. 5 is a plan view of the rotary connector in accordance with the second embodiment of the present invention; FIG. 6 is a primary plan view of the rotary connector in accordance with the second embodiment of the present invention, illustrating the connection status between the flexible cable and the lead block; FIG. 7 is a primary side view of the rotary connector in accordance with the second embodiment of the present invention, illustrating the connection status between the flexible cable and the lead block; FIG. 8 is a primary plan view of the rotary connector in accordance with the third embodiment of the present invention, illustrating the connection status between the flexible cable and the lead block; FIG. 9 is a primary side view of the rotary connector in accordance with the third embodiment of the present invention, illustrating the connection status between the flexible cable and the lead block. Note that the parts of rotary connector in the second and third embodiments and in addition, being the same as those in the first embodiment are denoted by the same reference numerals used in the first embodiment.

A rotary connector 80 in accordance with the second embodiment to be explained with reference to FIGS. 5 and 6 basically comprises: a stationary housing 81; a movable housing 3 connected to the stationary housing 81 so as to be rotatable relatively thereto; a flexible cable 5 as a flat cable housed within a space formed between the stationary and movable housings 81, 3; a movable structure 6 rotatably disposed between the stationary and movable housings 81, 3; totally two lead blocks 7 each being connected to corresponding one of both ends of the flexible cable 5; a temperature sensor 33 as temperature detection means for detecting temperature of the flexible cable 5, the temperature sensor being provided in the vicinity of the connection part of the flexible cable 5 and the lead block 7.

The stationary housing 81 includes a cylinder-shaped outer cylindrical portion 82, a circular bottom wall 83 provided on the end of the outer cylindrical portion 82, and a circular hole 84 formed in a central portion of the bottom wall 83. On the other hand, the movable housing 3 includes a cylinder-shaped inner cylindrical portion 11 and an approximately annular upper wall 11a provided on one end of the inner cylindrical portion 11. The rotary connector having such constructions of stationary and movable housings is further constructed such that the outer cylindrical portion 82 and the inner cylindrical portion 11 are coaxially disposed, and an annular housing section 4 as a space 83 is formed between the outer and inner cylindrical portions 82, 11. In addition, within the housing section 4 is disposed a movable structure 6.

An approximately rectangular temperature sensor 28 functions as temperature detection means and is composed of, for instance, a thermistor.

The temperature sensor 28 is mounted on the flexible cable 5 in the vicinity of the end thereof by appropriate means such as bonding to detect the temperature of conductors 5b of the flexible cable 5. In this construction, the temperature sensor 28 is mounted so that the surface thereof for detecting temperature is disposed to face the flexible cable 5 for the temperature sensor to securely be able to detect the temperature of the respective conductors 5b.

Subsequently, the connection status between the flexible cable and the lead block of the rotary connector in accordance with the second embodiment of the present invention will be explained in detail.

The connection status between the flexible cable and the lead block will be explained with reference to FIGS. 6 and 7 as follows: a flat strip of flexible cable 5 as a flat cable comprises two laminated first and second lengthy insulating films 29, 30 as a base film made of, for instance, a resin material such as polyethylene terephthalate (PET) and formed like a thin film in addition to being shaped like a flat strip; and four pieces of conductors 5b made of copper foil or the like and shaped like flat strip, the conductors being almost entirely interposed between the first and second insulating films 29, 30, and being formed equally spaced from each other and in parallel with each other in addition to having equal width dimension respectively.

Furthermore, each conductor 5b has a base conductor 5c entirely interposed between the first and second insulating films 29, 30, and an exposed conductor 5d stripped of the insulating films and projecting toward outside from the ends of the first and second insulating films 29, 30 while extending from the base conductor 5c.

Additionally, a flat strip of holding film 31 made of PET or the like is stuck adhering to one surface of the end of each exposed conductor 5d to hold the freely movable end thereof.

Such construction around the exposed conductor is found at each of both ends of the flexible cable 5.

Moreover, the temperature sensor 28 is mounted on the first insulating film 29 in the vicinity of the end of the first insulating film 29 of the flexible cable 5 by appropriate means such as bonding to detect the temperature of the conductors 5b of the flexible cable 5. In this construction, the temperature sensor 28 is mounted so that the surface thereof for detecting temperature is disposed to face the first insulating film 29 for the temperature sensor to securely be able to detect the temperature of the conductors 5b, respectively.

In addition, the lead block 7 includes a base section 32 made of an insulating material and four pieces of connection terminal leads 33 formed in the base section 32 such as by insert molding. Furthermore, the approximately rectangular base section 32 is, for example, made of an insulating synthetic resin and formed by molding, and has a rectangular through hole 32a therein around the central portion thereof.

Furthermore, on the side of the front end of the base section 32 (upper side of FIG. 7 when viewing the paper from a direction vertical to the paper) is provided a tilting table portion 32b projecting toward outside from the upper surface of the base section 32.

The connection terminal leads 33 made of an electrically conductive plate of metal such as a copper and formed by press molding in addition to having a predetermined width dimension comprises four pieces of connection parts 33a arranged being equally spaced from each other and external terminals 33b extending toward outside from the connection parts 33a. The connection terminal leads 33 are formed within the tilting table portion 32b of the base section 32 by insert molding so as to be integrally incorporated into the base section 32. In this case, the width dimension of the connection terminal lead 33 is approximately equal to those of the base conductor 5c and the exposed conductor 5d of the flexible cable 5.

In the above-described construction, an approximately central portion of the connection parts 33a of the connection terminal leads 33 is formed bridging across the through hole 32a and further, the base section 32 and the connection parts are formed such that the surface of the connection parts 33a on the side of the rear end thereof (lower side of FIG. 7 when viewing the paper from a direction vertical to the paper) and the surface of the base section 32 become coplanar.

The assembling operation for connecting the flexible cable and the lead block of the rotary connector will be explained below.

As shown in FIGS. 6 and 7, the flexible cable 5 is disposed on the lead block 7 such that the exposed conductors 5d of the flexible cable 5 is laminated on the upper surface of the base section 32 of the lead block 7.

Furthermore, in the above-stated construction, the connection parts 33a of the lead block 7 and the exposed conductors 5d of the flexible cable 5 are provided so as to correspondingly be laminated together and face each other, and further the exposed conductors 5d are disposed above the through hole 32a of the lead block 7.

In addition, the connection parts 33a and the laminated exposed conductors 5d are mechanically and electrically connected to each other respectively by appropriate means such as ultrasonic bonding or the like.

Moreover, in the above-stated construction, the temperature sensor 28 provided on the flexible cable 5 are mounted on an area of the flexible cable 5, the area corresponding to a position of the flexible cable 5 being placed on the base section 32 of the lead block 7.

Additionally, the conductors 5b and the connection terminal leads 33 are correspondingly and individually connected to each other.

The above-described connection construction allows the conductors 5b to pass a predetermined current therethrough, respectively. Therefore, the current flows through the respective conductors 5b and then the temperature thereof increases.

The rotary connector 80 having such construction is further fabricated as follows: fix the stationary housing 81 to a car body (not shown) while fixing the movable housing 2 to a handle member (not shown); and further, connect both ends of the flexible cable 5 to respective electronic devices on the sides of the car body and the handle member via associated lead blocks 7, 7 provided in the stationary and movable housings; thereby, realizing electrical connection means for providing a heater circuit device for a steering apparatus, an air bag system, a horn circuit or the like for motor vehicle with an electrical connection.

That is, the electrical connection means functions when a predetermined current flows through each of four conductors 5b of the flexible cable 5.

The above-described construction of the rotary connector 80 ensures the secure detection of temperature of the flexible cable 5 in the following manner. That is, a predetermined current flows through each of the conductors 5b of the flexible cable 5, and then, the temperature thereof increases by the current flow therethrough, and further, even when the flexible cable is wound or unwound, the temperature sensor 28 detects the temperature increase generated in the conductors 5b, i.e., the flexible cable 5, without the influence of vibration or deformation thereof. Operation for detecting the temperature of the flexible cable 5 allows the rotary connector to be able to preferably control the flexible cable 5 so as not to excessively generate heat.

Next, the connection status between a flexible cable and a lead block of the rotary connector in accordance with the third embodiment of the present invention will be explained.

As shown in FIGS. 8 and 9, the construction of a flexible cable 34 is similar to that of the flexible cable 5 employed in the previously described second embodiment and therefore, the explanation associated with the flexible cable is omitted.

As for the construction of a lead block 35, as shown in FIGS. 8 and 9, the construction thereof different from that of the lead block 7 employed in the previously described second embodiment will be explained.

Different from the base section 32 employed in the second embodiment, a base section 36 of the lead block 35 has an approximately rectangular recess 35c therein on the rear end side thereof (lower side of FIG. 9 when viewing the paper from a direction vertical to the paper). Within the recess 35c is provided an approximately rectangular temperature sensor 37 as temperature detection means, and in the above-described construction, the temperature sensor 37 is provided so that the upper surface thereof becomes coplanar with the surface of the base section 36.

Additionally, in the state of the temperature sensor 37 being provided and accommodated within the recess 35c of the base section 36, the flexible cable 34 is provided on the upper surface of the base section 36 of the lead block 35 in a manner similar to that of previously described construction and exposed conductors 5d are mechanically and electrically connected to associated connection parts 38a. In this case, the flexible cable 34 is provided such that the surface of a second insulating film 30 of the flexible cable 34 makes contact with the upper surface of the temperature sensor 37, thereby allowing the temperature sensor 37 to securely detect the temperature of the conductors 5b of the flexible cable 34, respectively.

As is described above, the rotary connector employed in this embodiment in accordance with the present invention is constructed so that the temperature sensor 37 is able to continuously detect the temperature increase generated in the flexible cable 34.

The processing of a temperature signal from the temperature detection means that is employed in the rotary connector of the second and third embodiments in accordance with the present invention is performed following the signal processing construction shown in FIGS. 2 and 3.

It should be noted that although the construction that temperature detection means is mounted on an area of a flexible cable, the area corresponding to a position of the flexible cable being placed on a base section of a lead block, or is directly mounted in the lead block is employed in the above-described second and third embodiments, the construction of temperature detection means in accordance with the present invention is not limited to the above-described construction and therefore, the construction that temperature detection means is provided near a connection part located between a flexible cable and a lead block may be employed.

A rotary connector according to the present invention is constructed so that temperature detection means is provided therein in a state of the temperature detection means being exposed within a housing section formed between a stationary housing and a movable housing and the rotary connector is thereby equipped with the capability to monitor the increase in temperature of a flexible cable due to excessive heat generated by current flow therethrough. That is, the rotary connector detects the temperature increase due to the excessive heat generation in the flexible cable via the temperature detection means, and then preferably controls the flexible cable not to excessively generate heat by receiving a signal from the temperature detection means, thereby realizing the provision of rotary connector capable of preventing deformation or fusion of insulating film.

Furthermore, the rotary connector according to the present invention is constructed such that the temperature detection means for detecting the temperature of the flexible cable is provided near the connection part between the flexible cable and the lead block and therefore, is able to detect and monitor the temperature increase due to excessive heat generated by current flow through the flexible cable. Thus, the present invention can provide an advantageous rotary connector capable of appropriately controlling the excessive heat generation in the flexible cable by detecting the temperature increase due to excessive heat generated in the flexible cable via the temperature detection means and then receiving an associated signal from the temperature detection means.

What is claimed is:

1. A rotary connector comprising:
    a stationary housing having an outer cylindrical portion and a holding means protruding outwardly from the outer cylindrical portion;
    a movable housing having an inner cylindrical portion and provided on the stationary housing so as to be rotatable relatively thereto;
    a flexible cable accommodated within a housing section formed between the stationary housing and the movable housing, a first end of the flexible cable fixed to the stationary housing and a second end of the flexible cable fixed to the movable housing;
    a first lead block connected to the first end of the flexible cable, the holding means having a first engagement portion that holds the first lead block and a guide portion that guides the flexible cable from the first engagement portion to the housing section;
    a second lead block connected to the second end of the flexible cable;
    a holding member fit to a cut-portion of the guide portion so as to be integral with the stationary housing; and
    a temperature detector contained within the holding member and exposed within the guide portion and in contact with the flexible cable so as to detect a temperature of the flexible cable.

2. The rotary connector of claim 1 further comprising a pressing member arranged to press the flexible cable against the temperature detector.

3. The rotary connector of claim 2 wherein the pressing member has an elastic portion that presses the flexible cable against the temperature detector.

4. The rotary connector of claim 3 further comprising a second engagement portion formed at the guide portion, the second engagement portion mating with and supporting a pressing member.

5. The rotary connector according to claim 1, wherein said temperature detector comprises a temperature sensor.

6. The rotary connector according to claim 1, wherein said temperature detector comprises a thermistor.

7. The rotary connector of claim 4, wherein the second engagement portion is a groove and the elastic portion faces the temperature sensor.

8. The rotary connector of claim 1, wherein the holding member has side walls with projections, the cut-portion has inner walls with recesses, and the projections are fitted to the recesses such that the holding member is fixed to the cut-portion.

9. The rotary connector of claim 1, wherein the holding member includes a printed wire board having a predetermined circuit pattern and electrically connecting with the temperature sensor.

10. The rotary connector of claim 9, wherein a connector is connected to the predetermined circuit pattern of the printed wire board.

11. The rotary connector of claim 9, wherein the holding member has hooks extending on a bottom of the holding member and the printed wire board engages with the hooks.

* * * * *